(No Model.)
J. A. BRISTOW & W. M. DIXON.
OYSTER TONGS.
No. 426,909. Patented Apr. 29, 1890.
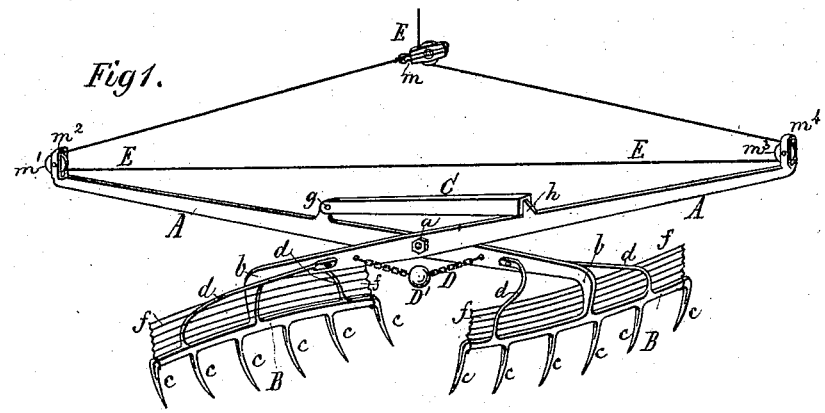
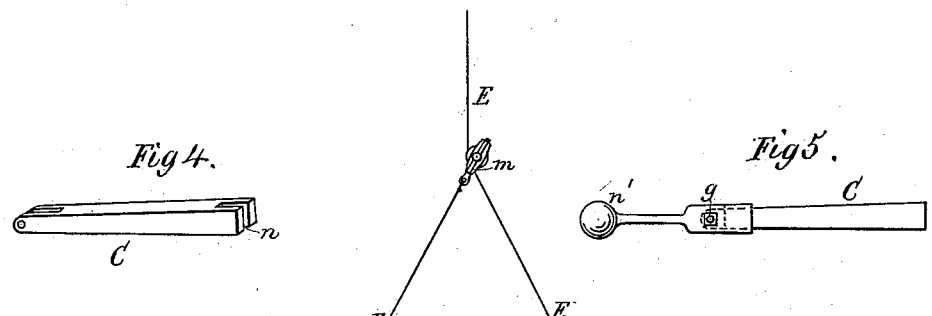
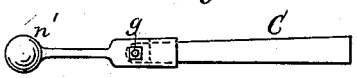
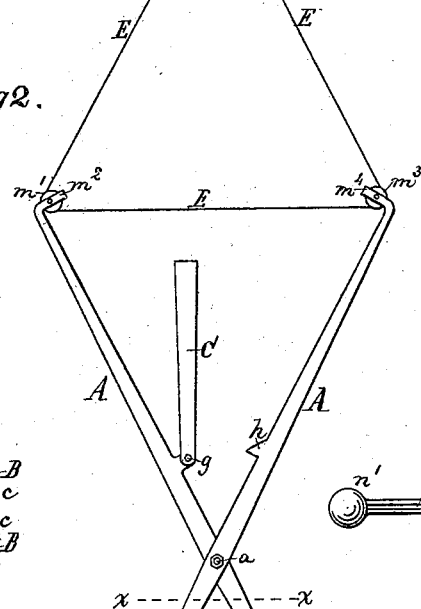
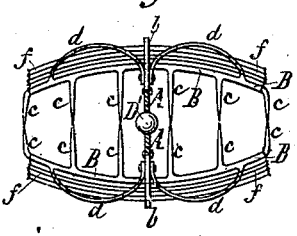
Witnesses:
J. P. Theo Lang.
Edward T. Fenwick
Inventors:
Joseph A. Bristow
William M. Dixon
by their Attys
Mason, Fenwick & Lawrence

UNITED STATES PATENT OFFICE.

JOSEPH A. BRISTOW AND WILLIAM M. DIXON, OF STORMONT, VIRGINIA.

OYSTER-TONGS.

SPECIFICATION forming part of Letters Patent No. 426,909, dated April 29, 1890.

Application filed January 10, 1890. Serial No. 336,531. (No model.)

*To all whom it may concern:*

Be it known that we, JOSEPH A. BRISTOW and WILLIAM M. DIXON, citizens of the United States, residing at Stormont, in the county of Middlesex and State of Virginia, have invented certain new and useful Improvements in Oyster-Tongs; and we do hereby declare the following to be a full, clear, and exact description of the invention, such as will enable others skilled in the art to which it appertains to make and use the same.

Our invention relates to oyster-tongs which have lever clamps or jaws that open and close on the joint-pivot by which they are connected between their upper and lower ends, and which are adapted for use in deep waters for gathering and bringing up above the surface thereof, or on board, oysters and other bivalves, also for handling and lifting out of such waters stones, shells, or other materials; and the object of the invention is to increase the efficiency of such tongs, facilitate their manipulation, and lessen the labor of operating them, and at the same time have them simple, light, strong, and durable.

The invention consists in certain novel features of construction, combinations, and arrangements of parts in oyster-tongs of the type above mentioned, whereby the said objects are attained, which features of invention are as represented in the accompanying drawings and hereinafter described and specifically claimed.

In the accompanying drawings, Figure 1 is a perspective view of our improved oyster-tongs open and set, ready to be lowered to the bed of a river, or as in the act of being lowered to such river-bed for the purpose of gathering and lifting oysters or other objects to a position above the surface of the water or into boats. Fig. 2 is a side elevation of the tongs as lowered, tripped, or unset, and as they appear when they have been closed upon gathered oysters or other objects and are ready to be lifted out of the water. Fig. 3 is a horizontal section of the closed tongs on the line *x x* of Fig. 2, looking downward. Fig. 4 is a detail perspective view of a modified construction of the buoyant automatic unsetting-brace by which the limbs of the tongs are held open, as shown in Fig. 1, and allowed to close automatically, as shown in Fig. 2. Figs. 5 and 6 show a modification of the setting and unsetting brace shown in Figs. 1, 2, and 4.

A A in the drawings are the levers of the tongs, crossed and united by a pivot, as at *a*. The lower end of these levers are bent inward at a right angle, so as to form center arms or portions, as indicated at *b*, and to these inwardly-bent arms or portions rake-heads B are welded, said heads being respectively bilged outwardly, similarly to a barrel, and provided with teeth *c*, and they also being sustained by strong braces *d*, which are welded by one of their ends to the rake-head and riveted by their other ends to opposite sides of the levers A A, said braces having a profile very similar to that of the lower angular ends of the levers A, as shown. The teeth *c* project inwardly at nearly a right angle, being curved slightly at their inner ends and gradually increased in length from the respective ends of the rake-heads to the center thereof, so that the center tooth or intermediate teeth, especially those nearest to the center of the heads, shall be of such greater length than the outer ones as to be able to penetrate between the oysters first and begin to gather them before the outside teeth are fully down to their work, and thus is insured a more certain gathering of the oysters at times when the tongs are "canted" either to the right or left. With this construction and arrangement of the teeth the rake-heads are also enabled to gradually right themselves to a level or parallel position with respect to the oysted-bed and gather the oysters with all of their teeth, while liability of their tripping or jumping over the oysters is avoided. By giving the heads a bilged form their capacity is increased and the gathered oysters are retained and prevented from falling out at the contracted spaces between or at the ends of the rake-heads.

On the tops of the rake-heads and inside the braces longitudinal wire bars suitably connected by uprights and forming back-frames *f f* are applied, the same being firmly fastened to the rake-heads, and, if desirable, to the angular arms or portions *b* of the levers A, and also to the fender-sustaining braces in any suitable manner. These wire-bar back-frames serve as strong open-work fenders for preventing the oysters falling over the tops of the rake-heads, as will be clearly understood from the drawings. The levers A A, from a short distance above the rake-heads, and the angular metal portions to which the rake-heads are attached or welded might be made of wood, and the upper ends of the angular metal portions firmly riveted to said wooden portions; but we prefer to have the levers and heads constructed as represented.

Above the pivot or joint of the levers of the tongs a setting and unsetting brace C is pivoted, as indicated at $g$, to a lug of one of the levers, and on the same horizontal plane a setting stop projection $h$ of angular form is provided on the other lever, as shown. The brace C (shown in Figs. 1, 2, and 4) is made of wood and is broader at its free end than at its pivoted end in order that it shall present a large horizontal surface to the water and thereby more readily float when out of frictional contact with the lug $h$. It is also thickened gradually toward said free end in order that it shall have a large abutting end for coming in frictional holding contact with the stop-lug $h$. Below the joint-pivot of the limbs A a chain D is applied, its respective ends being fastened to the respective levers of the tongs. On this chain a weight D', in form of a ball or other suitable shape, is applied. The chain should be of such length as to become nearly taut when the tongs are opened, as in Fig. 1. By means of this chain and weight, together with the preponderating weight of the lower portion of the levers of the tongs, the setting and unsetting brace C, after being set, as in Fig. 1, is made to retain its frictional bind against the stop-lug until the tongs strike the bed of the river, whereupon the rake-heads by spreading farther apart (the suspending cord or chain having become relaxed by reason of this contact) release the said brace, and said brace, by reason of its buoyancy, floats away from the stop-lug and allows the levers of the tongs to be closed by the manipulation of a suspending rope or chain E. This rope or chain is fastened by one end to a loop of a central sheave $m$, carried over, back of, and under a sheave $m'$, said sheave being pivoted in a loop $m^2$ at the upper end of one of the levers A, thence under, back of, and over a sheave $m^3$, said sheave being pivoted in a loop $m^4$ of the other lever A, and therefrom is carried back to and in front of the sheave $m$ and up to a support on a boat or other place, as illustrated. This rope remains taut while the tongs are being lowered, but naturally relaxes its tension and becomes slack immediately upon the tongs striking the bed of the river.

The chain and weight are not essentially necessary for holding the brace in its set position, as the weight of the tongs and the tension of the suspension-rope are sufficient for insuring the frictional bind of the said brace upon the set-stop lug; but while this is so the chain and weight contribute to this result, and at the same time perform another special and important office—viz., that of aiding the gravity of the lower portions of the levers of the tongs in closing upon the gathered oysters or other bivalves or objects. This weight-and-chain attachment is more particularly useful on large tongs employed for gathering and lifting large stones, coal, and the like, it contributing to the gravity of the lower portions of the tongs in closing and holding such objects when the upper portions are drawn upon by the suspending-cord.

In Fig. 4 the set-brace is modified by having a slot $n$ formed in its free end, and thus constructed its free end would receive the limb or stop-lug into its slot $n$ with a frictional bind sufficient to hold the set-brace until it is released by the tongs striking the bed of the river.

In Figs. 5 and 6 a set-brace, which is not necessarily buoyant, is shown. This brace has a weight $n'$ on its outer end, which by its preponderating gravity lifts the inner stop end of the brace above the stop-lug at the moment the frictional bind thereof is released by the tongs coming in contact with the bed of the river and the consequent relaxation of the suspending rope. This set-brace is fitted upon one of the levers of the tongs by means of the slot $n^2$, and pivoted thereto, as at $g$, and the weight is afterward applied on its end, as shown in Fig. 6.

The within-described tongs are simple, durable in construction, easily and rapidly manipulated, and very efficient in their work, and their general operation is as follows: The end of the operating rope or line being secured to the loop of the center sheave $m$, and the said rope or line therefrom passed through the sheaves $m'$ $m^3$ and then through the said center sheave $m$ to the hand of the operator, and the limbs of the tongs also moved apart, the automatically-unsetting brace is adjusted so as to bring its free end against its abutment, and thus set the brace holds the levers in their spread position while the tongs are being lowered from the boat to the bottom of the river by means of the operating line or rope. As soon as the heads of the tongs touch bottom the natural relaxation of the rope or operating-line allows the brace to be released from its abutment, and the said free end, if the brace is of wood, immediately floats out of the way of said abutment, and thus allows the levers of the tongs to be closed by a manipulation of said rope or line, so as to bring the rake-heads together with a load of oysters inclosed within them, and by continuing to draw the operating-line the loaded tongs are drawn up to the boat in a closed condition, as illustrated in Fig. 2.

What we claim as our invention is—

1. In oyster-tongs of the type described, in combination, the pivoted levers, the sheaves $m'$ $m^3$, applied upon the upper ends of the levers, the intermediate centering-sheave $m$, and the suspending rope or chain E, passed around the sheaves $m'$ $m^2$ $m^3$, substantially as described.

2. The combination, with the pivoted levers of oyster-tongs, of an automatically-releasing thrust set-brace connected to one of the levers and adapted to bear on the other lever, substantially as described.

3. Oyster-tongs comprising pivoted levers, a thrust set-brace connected by one end to one of the levers of the tongs and adapted to bear on the other lever, and a suspending cord or chain which allows the clamping ends of the levers to spread apart when the tongs strike the bed of the water, and thereby free the brace, substantially as described.

4. Oyster tongs or clamps comprising pivoted levers with clamping-heads and a buoyant thrust set-brace connected to the tongs and adapted to spread the levers and heads of the tongs apart and hold them so during the descent of the tongs to the bed of the water and to move out of its setting position when the tongs strike said bed, and thus allow the clamping-heads of the levers to close upon and gather oysters, substantially as described.

5. The combination, with the pivoted levers of oyster-tongs, of a transverse chain attached by its respective ends to the respective levers and a weight attached to the center of said chain, both the chain and weight being arranged below the pivot of said levers, substantially as described.

6. In oyster-tongs, pivoted levers having heads with teeth, said heads being attached to right-angular lower portions of the levers and being bilged longitudinally, and said teeth being gradually decreased in length toward the ends of the heads and the whole braced, substantially as described.

7. Rake-heads of oyster-tongs formed with a longitudinal bilge, substantially as described.

8. Rake-heads of oyster-tongs longitudinally bilged and provided with teeth which gradually decrease in length toward the outer ends of the heads, substantially as described.

9. In oyster-tongs, in combination, rake-heads bilged longitudinally and provided with teeth which gradually decrease in length from the center toward the ends of the heads, bent braces connected to the levers, levers provided with central right-angular arms which connect with the rake-heads, and wire-fender back-frames fastened to the rake-heads, all substantially as described.

In testimony whereof we affix our signatures in presence of two witnesses.

JOSEPH A. BRISTOW.
WILLIAM M. DIXON.

Witnesses:
L. C. BRISTOW,
THOS. E. WOODS.